United States Patent [19]

Okubo

[11] 3,861,710
[45] Jan. 21, 1975

[54] VEHICLE SAFETY SYSTEM

[75] Inventor: Masanobu Okubo, Kobe, Japan

[73] Assignee: Fujitsu Ten Ltd., Kobe, Japan

[22] Filed: Nov. 20, 1972

[21] Appl. No.: 308,045

[30] Foreign Application Priority Data
Nov. 22, 1971 Japan.................................. 46-93792

[52] U.S. Cl. ............. 280/150 AB, 180/98, 180/103
[51] Int. Cl. ............................................. B60r 21/08
[58] Field of Search ................. 280/150 AB; 180/98

[56] References Cited
UNITED STATES PATENTS

| | | | |
|---|---|---|---|
| 3,684,309 | 8/1972 | Uchiyamada.................. | 280/150 AB |
| 3,703,702 | 11/1972 | Arai............................... | 280/150 AB |
| 3,713,667 | 1/1973 | Blanchard...................... | 280/150 AB |
| 3,722,528 | 3/1973 | Fiala.............................. | 280/150 AB |
| 3,741,584 | 6/1973 | Arai............................... | 280/150 AB |

Primary Examiner—David Schonberg
Assistant Examiner—John P. Silverstrim
Attorney, Agent, or Firm—Daniel Jay Tick

[57] ABSTRACT

A vehicle safety system for protecting a person in a vehicle from impact shock due to collision with an object comprises a gas bag. An obstacle detecting sensor predicts a collision prior to such occurrence. An impact detecting sensor detects the shock of impact upon collision. The gas bag is actuated incrementally by incremental operation of the obstacle detecting sensor and the impact detecting sensor.

1 Claim, 6 Drawing Figures

PATENTED JAN 21 1975 3,861,710

OBSTACLE ABSENT

COLLISION IMMINENT

COLLISION IMPACT

VEHICLE SAFETY SYSTEM

BACKGROUND OF THE INVENTION

The present invention relates to a vehicle safety system. More particularly, the invention relates to a vehicle safety system utilizing a gas bag system to protect a person in a vehicle with great safety from impact shock upon the occurrence of an accidental collision.

Gas or air bag systems are known in which a gas bag is inflated by a shock of impact detecting signal produced by an impact detecting sensor at the time of collision. In other known systems, a gas bag is actuated by a collision prediction signal produced by an obstacle detection sensor before the collision.

The impact shock system requires a minimum expansion time of the gas bag, such as, for example 20 milliseconds, since the gas bag is inflated a little after the collision of the vehicle. Thus, the expansion pressure produced by the inflation of the gas bag is very high. This causes the pressure in the vehicle to change rapidly and results in undesirable medical effects on people in the vehicle.

In the obstacle sensing system, well known Doppler radar is utilized to predict collision with an obstacle by measuring the relative velocity and relative distance to the obstacle. The inflation of the gas bag is thereby completed before the collision. This is thought to be desirable, as capable of overcoming the disadvantage of the impact shock system. However, since the obstacle sensing system cannot determine the magnitude of an obstacle, the gas bag is forced to inflate even when the obstacle is small such as, for example, in the case of a dog or a cat, or other vehicles crossing directly in front of the vehicle, or when collision may fortunately be avoided, etc., in case a collision has not actually occurred. The inflation of the gas bag deprives the driver of the vehicle of his sight or impairs his ability to drive, and may thus cause a subsidiary accidental collision with obstacles other than that detected.

The principal object of the invention is to provide a gas bag vehicle safety system with greater safety and reliability than known systems.

An object of the invention is to provide a vehicle safety system which overcomes the disadvantages of known similar systems.

Another object of the invention is to provide a gas bag vehicle safety system which avoids a rapid change of pressure in the vehicle and thereby avoids adverse effects on people in the vehicle.

Still another object of the invention is to provide a gas bag vehicle safety system which does not impair the sight or driving ability of the driver when there is no actual collision.

Yet another object of the invention is to provide a vehicle safety system which functions to prevent injury to occupants of the vehicle efficiently, effectively and reliably.

BRIEF SUMMARY OF THE INVENTION

The vehicle safety system of the invention comprises a first, obstacle detecting, sensor and a second, impact detecting, sensor. The first and second sensors are coupled to a single gas bag via individual gas supply paths. The first sensor comprises Doppler radar for predicting a collision of the vehicle prior to an actual collision. The second sensor detects the force of impact upon the occurrence of a collision. The gas bag is inflated incrementally by incremental signals provided by the first and second sensors.

The vehicle safety system of the invention protects the driver and other people in the vehicle safely and surely from the shock of impact caused by an accidental collision.

BRIEF DESCRIPTION OF THE DRAWINGS

In order that the invention may be readily carried into effect, it will now be described with reference to the accompanying drawings, wherein.

Figure 1:
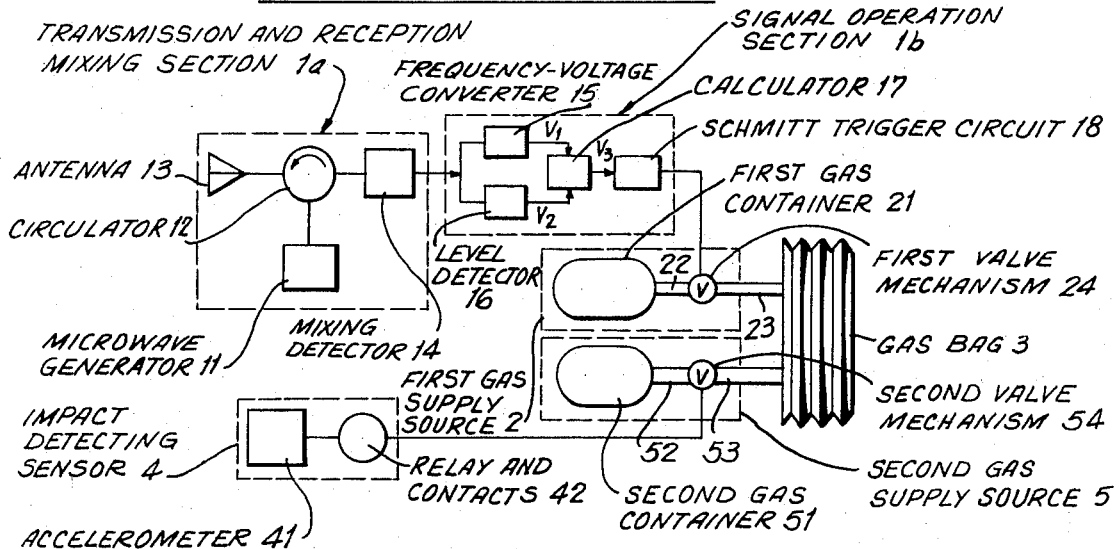
FIG. 1 is a block diagram of an embodiment of the vehicle safety system of the invention.
Figure 2:
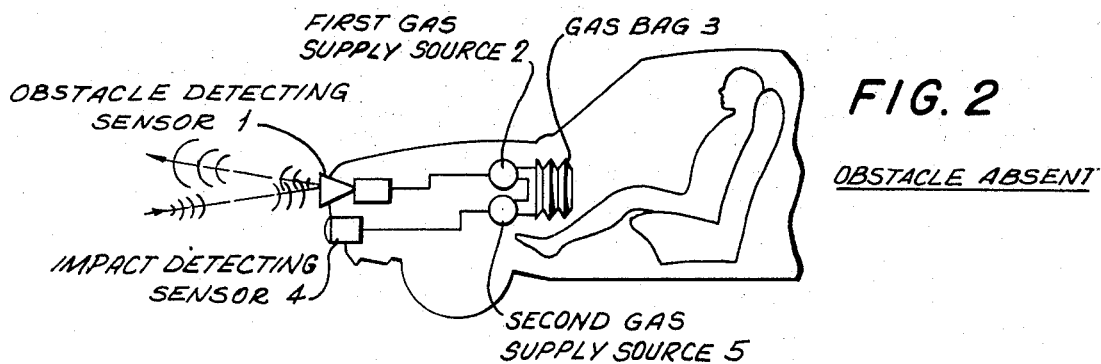
FIGS. 2, 4 and 5 are schematic diagrams illustrating the condition of the gas bag of the vehicle safety system of the invention in the absence of an obstacle, when a collision seems imminent and upon collision impact, respectively.

DETAILED DESCRIPTION OF THE INVENTION:

In FIG. 1, an obstacle detecting sensor 1, which is known Doppler radar apparatus, comprises known components including a transmission and reception mixing section 1a and a signal operation section 1b as is well known for predicting a collision in advance by detecting the relative velocity and the relative distance between the vehicle and an obstacle or obstacles. The transmission and reception mixing section 1a is provided with a supersonic or microwave generator 11, a circulator 12, an antenna 13 for transmission and reception and a mixing detector 14. The antenna 13 is located at the specified position in the front of a vehicle, as shown in FIG. 2.

The signal operation section 1b comprises a frequency-voltage converter 15, a level detector 16, a calculator 17 and a Schmitt trigger circuit 18. The transmission wave having a frequency $f_1$, from the generator 11 is passed through the circulator 12 and is radiated from the antenna 12 in a specific direction determined by the antenna characteristics.

If an obstacle is present within the range of the radiation, the reflection wave having a frequency $f_2$, reflected from the obstacle, is picked up by the antenna 13. The reflection wave $f_2$ and the transmission wave $f_1$ have a relation represented by the following equation.

$$f_2 \approx C + V/C - V f_1 \qquad (1)$$

wherein C represents the propagation velocity of the microwave or supersonic wave, and V represents the relative velocity between the vehicle and the obstacle.

The reflection wave $f_2$ is led to the mixing detector 14 via the circulator 12, in which a portion of the output $f_1$ of the generator 11 and the reflection wave $f_2$ are mixed and detected. Accordingly, the difference frequency $f_2$, shown in the following equation, which is the frequency of the Doppler signal, may be obtained.

$$f_d \approx f_2 - f_1 \approx (2f_1/C) \, V \quad (2)$$

Since the frequency $f_1$ of the transmission wave and the propagation velocity C are predetermined, by taking them together as a constant $K_1$, the difference signal is represented as $f_d \approx K_1 V$. Accordingly, the Doppler frequency $f_d$ may be determined as a value proportional to the relative velocity V to the obstacle.

On the other hand, the relative distance D is determined by the detection of level G of the Doppler signal. The effective operation distance for which the device of the present invention is intended to apply is within several meters. According to experiment, it is confirmed that the level G is represented as $G = K_2/D$. The level G is thus in inverse proportion to the relative distance D. $K_2$ is a constant.

It is therefore determined whether or not the vehicle will collide by feeding the Doppler signal to the signal operation section 1b and determining a DC voltage $V_1$ corresponding to the Doppler frequency $f_d$ thereof from the frequency-voltage converter 15 and a DC voltage $V_2$ corresponding to the level G thereof from the level detector 16. After the two DC voltages $V_1$ and $V_2$ are calculated in the calculator 17, the output voltage $V_3$ of said calculator is supplied to the Schmitt trigger circuit 18. The system of the invention is so designed that if the DC voltage $V_3$ is confirmed to exceed a limit level, a collision prediction signal is supplied from the Schmitt trigger circuit 18 to a first gas supply source 2.

The first gas supply source 2 comprises a first gas container 21, two pipes 22 and 23, and a valve mechanism 24 and supplies highly compressed gas to a gas bag 3. The first gas container 21 is filled with the proper volume of gas for inflating the gas bag 3 to a semi-expanded condition so as not to interrupt operation and control of the vehicle by the driver.

An impact detecting sensor 4 is provided adjacent the front bumper of the vehicle, as shown in FIG. 2. The impact detecting sensor 4 comprises an accelerometer 41 and a relay and contacts 42. When the impact detecting sensor 4 detects an impact shock exceeding a predetermined level, the relay 42 is energized and controls its contacts to produce a signal for supplying gas from a second gas supply source 5 to the gas bag 3.

The second gas supply source 5 has the same structure as, and operates similarly to the first gas supply source 2. A second gas container 51 of the second gas supply source 5 is filled with gas in a volume supplementing the volume of gas in the first gas container 21, so that the contents of both gas containers 21 and 51 will fully inflate the gas bag.

Figure 3:
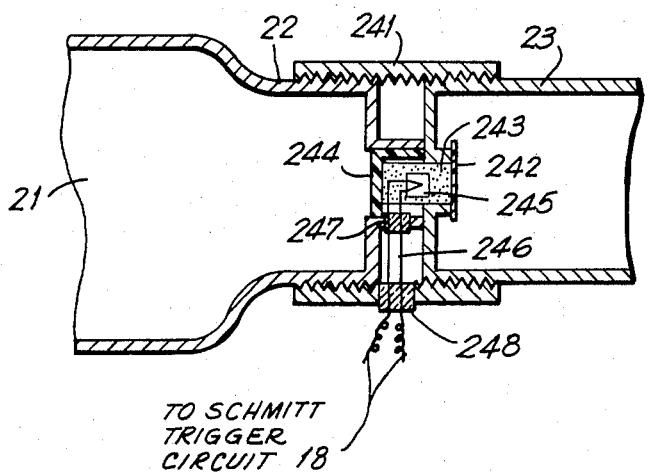
FIG. 3 is a sectional view of an embodiment of a valve arrangement of the vehicle safety system of the invention.

FIG. 3 shows one embodiment of a valve mechanism for the first gas supply source 2. The valve mechanism 24 (FIG. 1) is mounted between the pipe 22 from the first gas container 21 and the pipe 23 to the gas bag 3 (FIG. 1). The valve mechanism comprises a connecting pipe 241, a partition wall 242, explosive powder 243, a moisture insulation layer 244, an electric detonator 245, lead wires 246 and insulation beads 247 and 248.

An electric current flows through the lead wires 246 when the Schmitt trigger circuit 18 of the signal operation section 1b (FIG. 1) produces an operation signal. The electric current in the lead wires 246 fires the electric detonator 245 and thus explodes the explosive powder 243. The partition wall 242 and the moisture insulation layer 244 are destroyed by the explosion to permit the supply of the highly compressed gas in the first gas container 21 to the gas bag 3 through the pipes 22 and 23.

Figure 4:
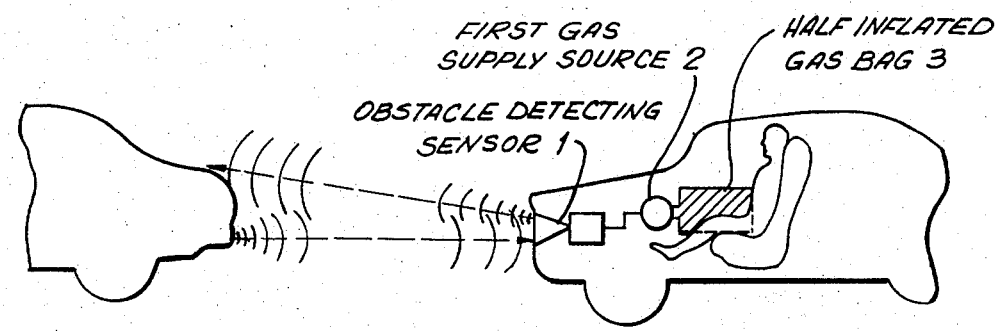
Figure 5:
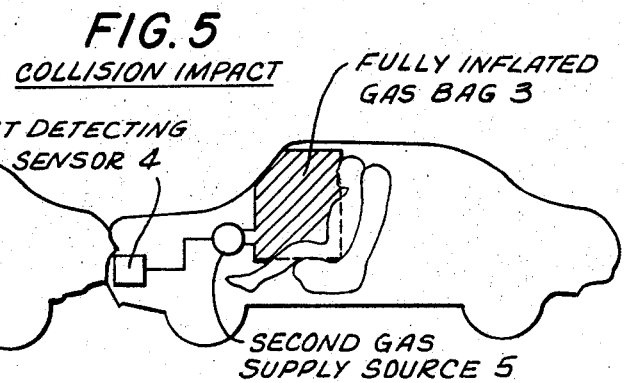

The gas bag 3 is placed under the dashboard of the vehicle, as shown in FIG. 2, and is incrementally inflated in such a manner that one half of the prescribed full inflation or expansion volume is provided by gas from the first gas supply source 2 (FIG. 1), as shown in FIG. 4. Then, the other half of the full inflation volume is provided by gas from the second gas supply source 5 (FIG. 1), as shown in FIG. 5.

The operation of the system of the present invention is now described by example. As shown in FIG. 4, when it is determined that another vehicle rapidly comes near and crosses ahead of the vehicle equipped with the system of the invention, or a small obstacle, such as a dog, a cat, etc., appears while the vehicle is moving and radiating supersonic waves or microwaves forward, a reflection wave is received from the obstacle and the relative velocity V and the relative distance D are determined in order to judge whether or not a collision is imminent.

The vehicle safety system of the invention predicts the occurrence of a collision and produces prediction signals to open the valve mechanism 24 to open a duct between the pipes 22 and 23 (FIG. 1). As a result, highly compressed gas flows from the first gas container 21 into the gas bag 3 to semi or half inflate the gas bag, as shown in FIG. 4. If a collision can fortunately be avoided in the aforedescribed circumstances such as the appearance of another vehicle, or if a collision occurs and produces only a small shock of impact, the shock of impact is detected by the accelerometer 41.

Thus, when there is a collision with a small obstacle, the impact detecting sensor 4 does not provide the operation signal and the gas bag 3 remains in its semi-expanded or half inflated condition. Accordingly, the driver is not deprived of his sight, as he would be if the gas bag 3 fully inflated, and he is not impaired in his ability to drive or control the vehicle. Thus, subsidiary collisions are prevented.

When the aforedescribed conditions arise, but the obstacle is a large one such as, for example, another vehicle, a building, etc., and is detected in front of the vehicle, collision prediction signals are produced. The collision prediction signals cause the gas bag 3 to be semi-expanded or semi or half inflated. Then, the vehicle collides violently with the obstacle. The shock of impact is detected by the accelerometer 41 of the impact detecting sensor 4 (FIG. 1), and since the shock of impact is determined to exceed the predetermined value, operation signals are produced and energize the relay 42 of the impact detecting sensor.

The operation of the relay 42 closes the relay contacts to close a power supply circuit or path from the power source to a valve mechanism 54 of the second gas supply source 5. The valve mechanism 54 is similar to the valve mechanism 24 and is detonated by the current flow therethrough produced by the operation signals. This results in the opening of a duct between the pipes 52 and 53 so that gas flows from the second gas container 51 to the gas bag 3 via the pipes 52 and 53 (FIG. 1). As a result, highly compressed gas from the second gas container 51 flows into gas bag 3 to expand or inflate said gas bag to its full extent, as shown in FIG. 5. The entire body of the driver of the vehicle or other person in the vehicle is then covered by the gas bag 3 so that the driver and/or such other person or persons are fully protected from injury.

In the aforedescribed embodiment of the vehicle safety system of the invention, two gas supply sources for the gas bag 3 are provided. The gas is supplied to the gas bag 3 in accordance with two different input signals, each of which controls the flow of gas from a corresponding one of the gas supply sources. A single gas supply source may be utilized. The gas supply source is filled with a volume of gas sufficient for fully inflating or expanding the gas bag 3. A single valve mechanism may be utilized with the gas supply source, or two valve mechanisms may be utilized, as shown in FIG. 6.

Figure 6:
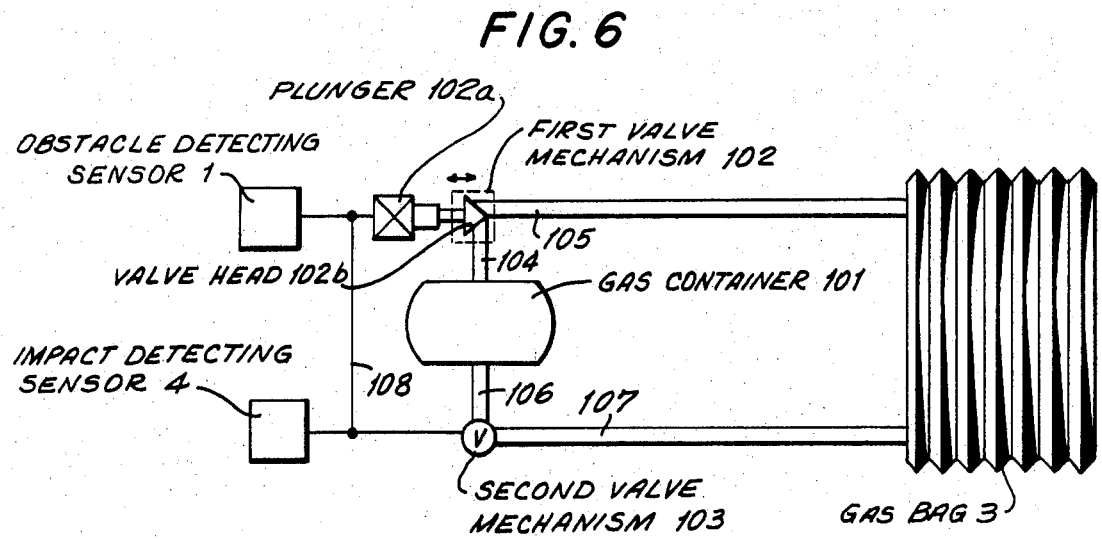
FIG. 6 is a schematic diagram of another embodiment of a valve arrangement of the vehicle safety system of the invention.

In the embodiment of FIG. 6, a first valve mechanism 102 and a second valve mechanism 103 are provided for a single gas container 101. The first valve mechanism 102 is so constructed as to respond to the obstacle detecting sensor 1 and controls a valve head 102b via a plunger 102a which is moved to ON and OFF thereby coupling pipes 104 and 105 for a specific predetermined period of time. The second valve mechanism 103 utilizes a detonation structure, as shown in FIG. 3, and operates in the same manner as the aforedescribed embodiment. The second valve mechanism 103 couples pipes 106 and 107.

The output of the impact detecting sensor 4 may be electrically connected to the plunger 102a via a lead 108. It is thus alternatively possible to use a single gas supply path in common and is very economical. In such an arrangement, the plunger 102a is opened first by the obstacle detecting sensor 1 for a predetermined period of time and is then opened again by the impact detecting sensor 4.

As is apparent from the foregoing description, since the vehicle safety system of the invention operates a single gas bag incrementally under the control of the first and second sensors 1 and 4, there is no danger, as in the known devices, that the driver will be deprived of his sight or have his ability to control the vehicle impaired by the gas bag even when the obstacle detecting sensor 1 misjudges. Furthermore, there is no adverse effect on the human body, since the time required for the gas bag to be fully inflated may be delayed in the system of the invention. The air pressure in the vehicle does not change rapidly due to the inflation of the gas bag. Accordingly, the vehicle safety system of the invention provides a very advantageous gas bag system which protects the driver and any person in a vehicle from personal injury in an accidental collision.

While the invention has been described by means of specific examples and in specific embodiments, I do not wish to be limited thereto, for obvious modifications will occur to those skilled in the art without departing from the spirit and scope of the invention.

I claim:

1. A vehicle safety system for protecting a person in a vehicle from the shock of impact in a collision with an obstacle, said vehicle safety system comprising a gas bag in the vehicle adjacent the person;

a gas supply source comprising a first gas supply source having a predetermined volume of gas to partially inflate the gas bag and a second gas supply source having a sufficient volume of gas to fully inflate the partially inflated gas bag;

a first gas supply path coupling the first gas supply source to the gas bag;

first valve means in the first gas supply path for controlling the flow of gas from the first gas supply source through the first gas supply path, the first valve means normally preventing the flow of gas;

a second gas supply path coupling the second gas supply source to the gas bag;

second valve means in the second gas supply path for controlling the flow of gas from the second gas supply source through the second gas supply path, the second valve means normally preventing the flow of gas;

obstacle detecting sensor means at the front of the vehicle electrically connected to the first valve means for producing collision prediction signals when an obstacle is in the path of the vehicle, the collision prediction signals being transmitted to the first valve means and opening the first valve means to partially inflate the gas bag; and impact detecting sensor means at the front of the vehicle electrically connected to the second valve means for producing impact operation signals when the vehicle is in collision, the impact operation signals being transmitted to the second valve means and opening the second valve means to fully inflate the gas bag, the gas bag being fully inflated by the opening of the second valve means after the opening of the first valve means.

* * * * *